A. B. BARY.
Bobbin-Winders for Sewing-Machines.

No. 137,048. Patented March 25, 1873.

ATTEST
H. F. Eberts
Charles J. Hunt

Inventor
Alexander B. Bary
per atty
Thos. S. Sprague

UNITED STATES PATENT OFFICE.

ALEXANDER B. BARY, OF DETROIT, MICHIGAN.

IMPROVEMENT IN BOBBIN-WINDERS FOR SEWING-MACHINES.

Specification forming part of Letters Patent No. 137,048, dated March 25, 1873.

*To all whom it may concern:*

Be it known that I, ALEXANDER B. BARY, of Detroit, in the county of Wayne and State of Michigan, have invented a new and useful Improvement in Bobbin-Winders for Sewing-Machines; and I do declare that the following is a true and accurate description thereof, reference being had to the accompanying drawing and to the letters of reference marked thereon and being a part of this specification, in which—

Figure 1:
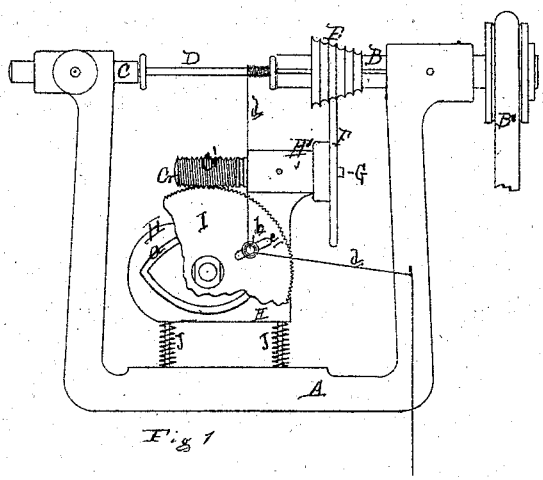
Figure 2:
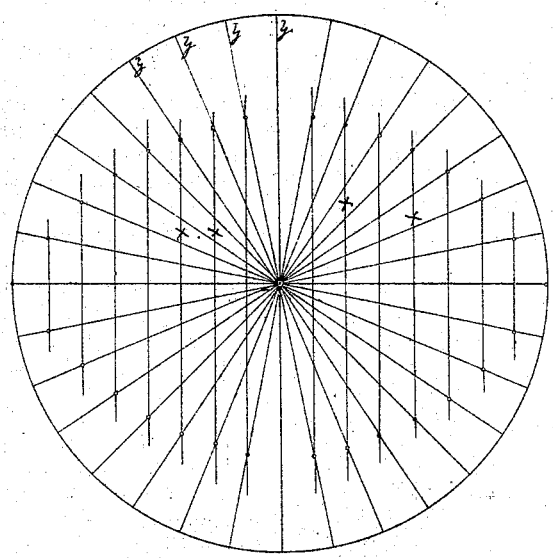

Figure 1 is a plan of a bobbin-winding device, showing my improvement. Fig. 2 is a diagram showing the method of laying out the curve which produces the uniform reciprocation of the thread-guide.

In the drawing, A represents a frame of three sides of a rectangle. In the end of one arm is a spindle, B, driven by a belt, B', or in any other convenient manner, the device being adapted for attachment to a sewing-machine to wind the bobbin. C is the tail-spindle journaled in the end of the other arm of the frame, and between the two spindles the bobbin D is chucked, to revolve with the live-spindle. E is a friction-wheel in the live-spindle, and is coned to give different speeds. F is a friction-pinion on a shaft, G, engaging with any one of the grooves in the cone E, which is feathered on the live-spindle. The shaft G is journaled in a bracket, H', on the front end of a plate, H, and projects beyond the bracket-bearing, where it is formed into a screw, G'. In the face of the plate H there is cut a curved slot, partially shown at $a$, in Fig. 1. In this slot is placed a wrist-pin, $b$, which projects up through a radial slot, $c$, in a worm-wheel, I, journaled on a stud rising from the plate H in the intersection of the conjugate and transverse diameters of the curve. The worm-wheel meshes with the screw on the shaft G, and is rotated by it. $d$ is the thread which is being wound on the bobbin, and is passed through an eye in the top of the wrist-pin $b$, which thus becomes the thread-guide. The worm-wheel being slowly rotated by the means described carries the thread-guide with it, not as a fixed crank-pin moving slowly as it passes the center and more rapidly between them, but reciprocating between the ends of the curve with uniform speed, thereby guiding the thread to the bobbin in such a manner that the coils will lie close together without overlapping.

In winding fine thread the friction-wheel should be driven by a groove at the small end of the cone, and vice versa, the friction-wheel being kept in contact with and one of the grooves in the cone by springs J J in the dowels behind the plate H, which slides on said dowels.

To describe the curve shown at $a$ strike a circle whose diameter equals the transverse diameter of the curve; then across the diameter draw any given number of ordinates, $x$, as in Fig. 2; divide the circumference of the circle into twice that number of spaces, and draw radial lines $y$, and the points of intersection of the radiuses with the ordinates furnish the points through which to draw the lines of the curve.

Instead of a curved slot the curve may be a raised projection from the face of the plate, with the wrist-pin embracing it.

What I claim as my invention, and desire to secure by Letters Patent, is—

In mechanism of the described construction, the combination of the grooved cone E, friction-wheel F, worm G', slotted gear-wheel I, slotted plate H, wrist-pin $b$, and springs J J, arranged as described, for the purpose set forth.

ALEXANDER B. BARY.

Witnesses:
H. F. EBERTS,
H. S. SPRAGUE.